(12) United States Patent
Thysell

(10) Patent No.: US 6,328,237 B1
(45) Date of Patent: Dec. 11, 2001

(54) CRUSHER

(75) Inventor: Urban Thysell, Ystad (SE)

(73) Assignee: Svedala-Arbra AB, Svedala (SE)

( * ) Notice: Subject to any disclaimer, the term of this patent is extended or adjusted under 35 U.S.C. 154(b) by 0 days.

(21) Appl. No.: 09/553,225

(22) Filed: Apr. 20, 2000

Related U.S. Application Data

(63) Continuation of application No. PCT/SE98/01956, filed on Oct. 29, 1998.

(30) Foreign Application Priority Data

Oct. 29, 1998 (SE) .................................... 9703967

(51) Int. Cl.[7] ..................................... B02C 2/04
(52) U.S. Cl. .............................................. 241/213
(58) Field of Search ................... 241/207, 215, 241/286

(56) References Cited

U.S. PATENT DOCUMENTS 4,084,756    4/1978    Coxhill .

*Primary Examiner*—Mark Rosenbaum
(74) *Attorney, Agent, or Firm*—Luedeka, Neely & Graham, P.C.

(57) ABSTRACT

A gyratory crusher comprises a body and an annular outer shell, which is fixedly connected to the body about an essentially vertical center axis. A shaft member is arranged radially inside the outer shell to perform, during crushing, a swinging movement about the center axis. A crushing chamber forms between the outer shell and an annual inner shell arranged on the shaft member. A piston member is displaceable along the center axis and is arranged in a cylinder member belonging to the body. The upper end of the piston member supports, via an intermediate thrust bearing, a lower end of the shaft member. A transport duct for supplying to the thrust bearing a medium promoting the bearing function extends through the piston member and is defined upstream of the piston member by a transfer means. At least a part of the transfer means is displaceable relative to the piston member and at least a part is displaceable relative to the cylinder member.

9 Claims, 5 Drawing Sheets

CRUSHER

This application is a continuation of international application No. PCT SE/98/01956, filed Oct. 29, 1998.

FIELD OF THE INVENTION

This invention relates to a gyratory crusher having inner and outer shells and a crushing chamber there between.

BACKGROUND ART

Gyratory crushers, such as cone crushers and spindle crushers, generally comprise an outer shell which is fixedly connected to a body, and an inner shell which is arranged radially inside said outer shell. The inner shell is connected to an internal shaft member for executing a gyratory movement. Between the two shells a crushing chamber is defined, in which crushing of a material is carried out as the inner shell moves.

It is common for the shaft member to be vertically adjustable for changing an axial distance between the two shells. As a result, the particle size of the crushed material can be adjusted. The vertical adjustability is usually achieved by the shaft member being supported by a piston member which is vertically adjustable in a cylinder member.

The shaft member, which must be rotatable relative to the piston member, is mounted in a thrust bearing which is arranged between the shaft member and the piston member and to which a medium for promoting the function of the bearing, suchas a lubricant or hydraulic fluid, must be supplied during operation of the crusher.

The medium is supplied to the thrust bearing from a tank via a transport duct extending through the cylinder member and the piston member. In the transition between the cylinder member and the piston member, the duct is formed on the side of the cylinder member as a small opening and on the side of the piston member as an area of a large extent in the axial direction, thus allowing the medium to be transferred in each individual position of the piston. It is then necessary for the axial length of the area of the duct in the piston member adjacent to the cylinder member to be at least as great as the length of stroke of the piston member, i.e. the distance between the top and bottom position of the piston member.

A problem in prior-art gyratory crushers is that they are large and unwieldy, and especially they need a relatively large space in the vertical direction. This causes difficulties and a limited possibility of choosing the position of such crushers. Particular difficulties exist in mobile crushers.

SUMMARY OF THE INVENTION

An object of the present invention is to provide a gyratory crusher which is improved in relation to prior-art constructions.

A specific object is to provide a crusher construction which permits a lower height in relation to the crushing capacity than in existing constructions.

According to the invention, these and other objects which will appear from the following specification are now achieved by a gyratory crusher which is of the type described by way of introduction and which in addition has a novel and improved transport duct system.

According to the invention, the gyratory crusher thus has a transport duct for supplying to a thrust bearing a medium promoting the bearing function via a piston member, said thrust bearing being arranged between the piston member and a shaft member supported thereby. The transport duct is defined upstream of the piston member by a transfer means, which has at least a portion or a part which is displaceable relative to the piston member and at least a portion or a part which is displaceable relative to a cylinder member, in which the piston member is displaceable.

According to one aspect of the invention, there is thus provided a transport duct, the extent or length of which in the axial direction depends on the position of the piston member.

This makes a reduction of the axial extent of the piston member possible since the piston member need not accommodate the entire extent of the transport duct in all axial positions.

Preferred embodiments are defined in the subclaims. In one embodiment, the piston member is thus axially movable between an upper and a lower position, between which the distance is greater than the extent of the piston member in the axial direction. This results in a crusher, in which the piston member, in spite of a great length of stroke, takes up little space in the vertical direction.

The transfer means comprises in a particularly preferred embodiment at least one annular element which is movable in the axial direction.

In a special embodiment, the annular element is movably arranged between the piston member and the cylinder member. The transport duct extends from an inlet in the cylinder member radially through the annular element to the piston member. In each transition between cylinder member, annular element and piston member, the transport duct has an axially extended transfer area. By the duct along its radial extent being provided with two axially extended transfer areas, the length of each of these transfer areas could be halved compared with prior-art constructions. Thus, the height of the piston member could practically be halved without any reduction of the capacity. A particular advantage of this embodiment is that the transfer member can be made in one piece, which means that the number of movable parts can be kept small.

In another embodiment, with or without one or more annular elements, the transfer means has an axially adjustable length, such that a predetermined length is assigned to each piston position. Owing to a thus variable length, the piston can be given a length of stroke which is essentially an unlimited number of times greater than the length of the piston member in the axial direction The transfer means can take over the greater part of the extent of the transport duct in the axial direction in different positions.

In a particularly preferred embodiment, the adjustable length of the transfer means has been achieved by the transfer means being telescopic and comprising a plurality of telescopically movable, annular elements which are preferably slidingly displaceable relative to each other. An upper element is connected to the piston member, and a lower element is connected to the cylinder member in a fixed axial position. This solution is extremely reliable owing to its simple design.

In an especially preferred embodiment, the telescopic transfer means is recessed in the piston member and/or in the base of the cylinder member. This results in a further decrease of the height.

BRIEF DESCRIPTION OF THE DRAWINGS

For the purpose of exemplification, the invention will now be described in more detail with reference to various preferred embodiments shown in the accompanying drawings.

DESCRIPTION OF PREFERRED EMBODIMENTS OF THE INVENTION

Figure 1:
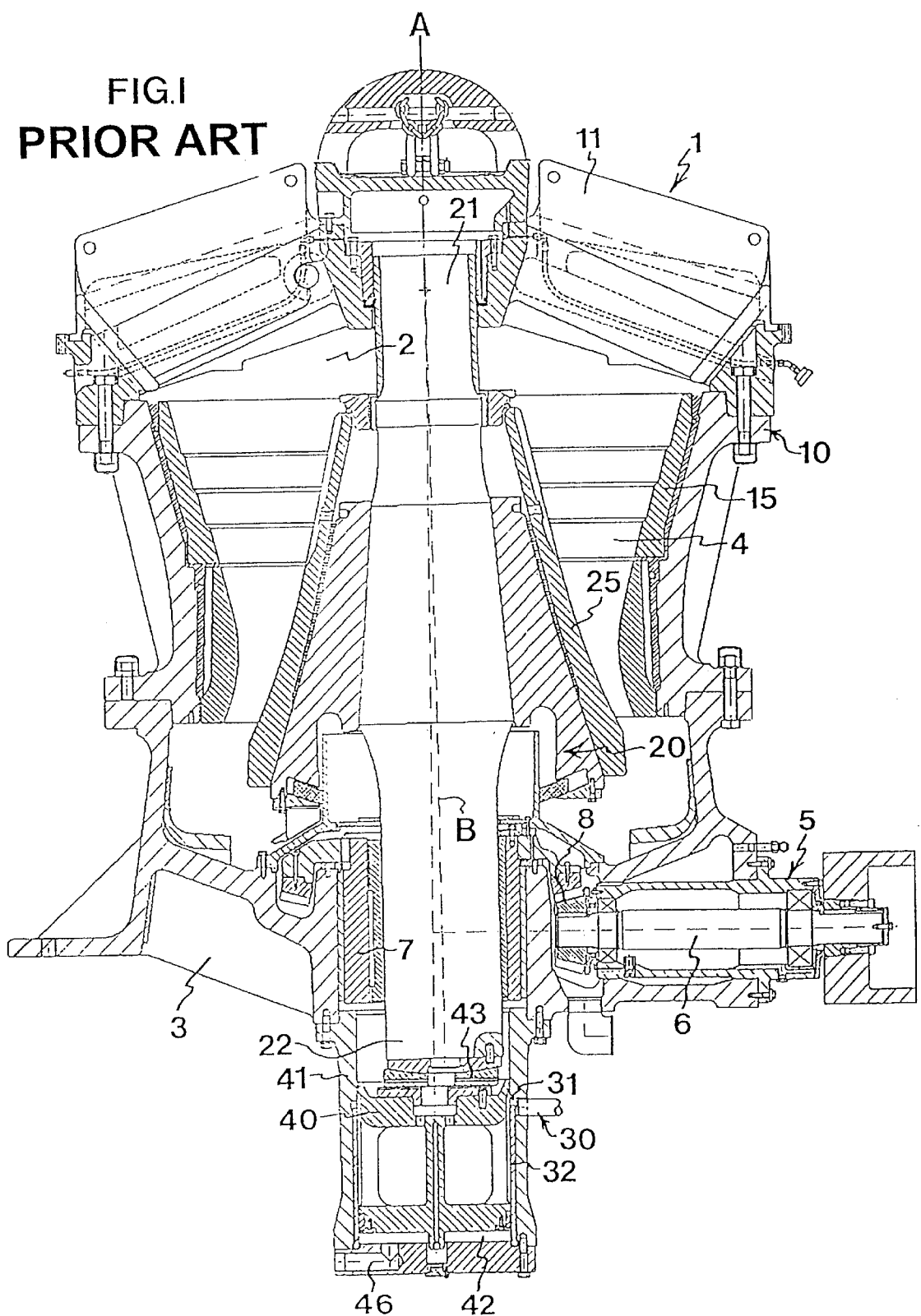
FIG. 1 is a longitudinal section of a gyratory crusher according to prior art, the piston member being in a lower position.

FIG. 1 shows a prior-art gyratory crusher 1. During crushing, stone material is supplied to an inlet 2, and the crushed stone material is discharged through an outlet 3. The crusher 1 comprises a body 10, which has a holding means 11 for holding an upper end 21 of a shaft member 20. In the holding means 11, the shaft member 20 is arranged about an essentially vertical center axis A. Crushing takes place in a crushing chamber 4 between an outer shell 15 mounted internally in the body 10, and an inner shell 25 mounted externally on the shaft member 20.

The shaft member 20 has a symmetry axis B, which extends at an intermediate angle relative to the centre axis A of the crusher 1. While operating the crusher, the shaft member is made to execute a gyratory swinging movement about the center axis A of the crusher 1 while maintaining the angle between the center axis A and the symmetry axis B of the shaft member 20. This is achieved by means of a driving unit 5 comprising a power transmission shaft 6, which is arranged, in operation, to rotate via a gear 8 a drive means 7 which is mounted along the center axis A of the crusher 1. The shaft member 20 is asymmetrically mounted in the drive means 7, whereby the shaft member 20 is made to execute a swinging rotary movement during operation of the crusher.

By a gyratory crusher is, in connection with the present invention, meant a crusher, in which the shaft member 20 executes a gyratory movement, i.e. a movement during which the two crushing shells 15, 25 approach one another along a rotating generatrix and move away from one another along a diametrically opposed generatrix. The invention is thus not limited to crushers with an intermediate angle between the centre axis A of the crusher and the symmetry axis B of the shaft member. The axes A and B can just as well be parallel.

The crusher 1 is arranged to produce different fractions or particle sizes of the crushed material by the shaft member 20 being vertically adjustable in the body 10. This is achieved by the upper end 21 of the shaft member 20 being vertically adjustably mounted in the holder 11 and in the drive means 7, and by the shaft member 20 at its lower end 22 being supported by a vertically adjustable piston member 40. The piston member 40 is arranged in a cylinder member 41 belonging to the body 10. The piston member is raised and lowered by hydraulics via a hydraulic chamber 42, which is positioned below the piston member and which is supplied with a hydraulic fluid via a supply duct 46.

A thrust bearing 43 is arranged between the piston member 40 and the shaft member 20. The specific design of the thrust bearing is not critical to the invention, which is applicable to rolling bearings, slide bearings as well as hydrostatic bearings.

In operation, the thrust bearing 43 is supplied with a medium for promoting the function of the bearing via a transport duct 30. Typical media for promoting the bearing function are, depending on the type of bearing concerned, lubricants and hydraulic fluids. However, the invention will be described below with referenceto a lubricant. The transport duct 30 extends from a lubricant tank (not shown) via an inlet 31 in the cylinder member 41 and through the piston member 40 to the thrust bearing 43. In the transition area between the cylinder member 41 and the piston member 40, the duct 30 has a great extent in the axial direction in a transition space 32 to permit the supply of lubricant along the entire length of stroke of the piston member 40.

The invention will now be described, and the parts not shown can have a design corresponding to that of the crusher 1 shown in FIG. 1. Equivalent components of the various embodiments will be given the same reference numerals.

Figure 2:
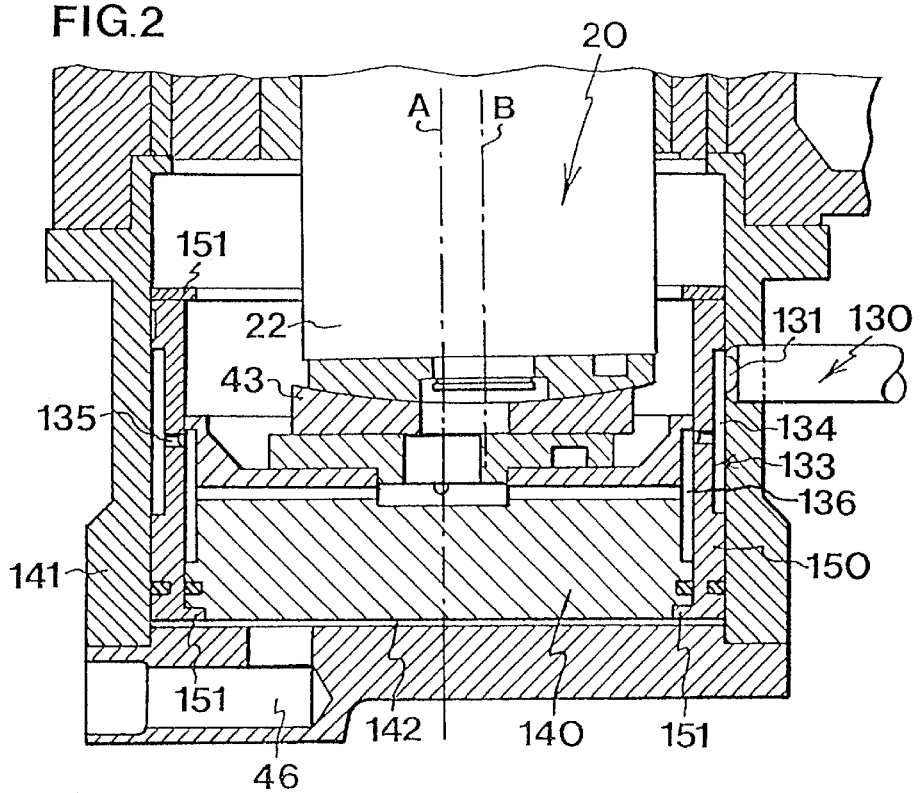
FIG. 2 is a longitudinal section of a lower area of a crusher according to a first embodiment of the invention, the lower position of the piston member being illustrated.
Figure 3:
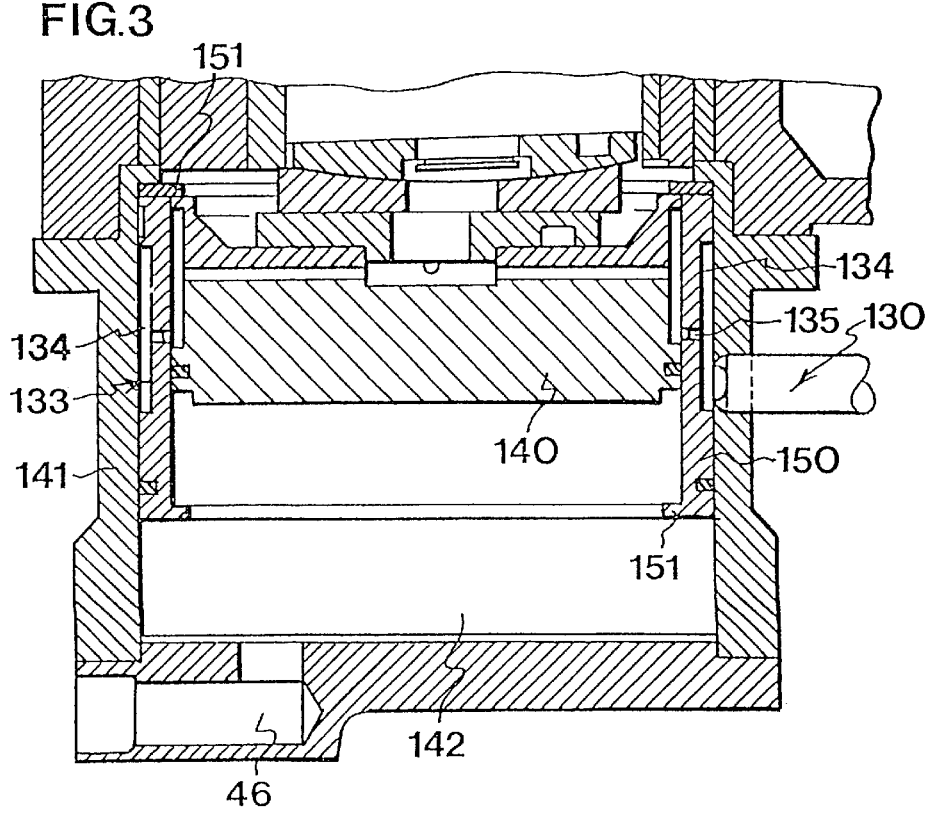
FIG. 3 corresponds to FIG. 2, except that the upper position of the piston member is illustrated.

FIGS. 2 and 3 show a first embodiment of the invention. In this embodiment, a piston member 140 is arranged in a cylinder member 141 to support, via a thrust bearing 43, a shaft member 20 in a vertically adjustable manner. A transfer means in the form of an annular element 150 arranged radially between the cylinder member 141 and the piston member 140 defines a portion 133 of a transport duct 130 upstream of the piston member 140. The transfer means 150 is displaceable in the axial direction on the inside of the cylinder member 141, and the piston member 140 is in turn displaceable in the transfer means 150 in the axial direction. The transfer means 150 forms in this manner a kind of intermediate piston and can thus follow the axial motion of the piston member 140.

FIG. 2 shows the piston member 140 and the transfer means 150 in the lowermost position of the piston member. FIG. 3 shows the piston member 140 and the transfer means 150 in the uppermost position of the piston member 140.

The transport duct 130 extends through an inlet 131 in the wall of the cylinder member 141 radially through the transfer means 150 and into the piston member 140. The duct portion 133 in the transfer means 150 comprises a transition space 134 which is formed on the radial periphery of the transfer means 150 and which has a great axial extent, such that the transition space 134 in all the axial positions of the transfer means 150 communicates with the inlet 131. Moreover, the duct portion 133 comprises a duct portion 135, which extends to the radial inside of the transfer means 150 and which is centrally arranged and has a small axial extent. The duct portion 135 in turn communicate with a transition area 136 of great axial extent on the radial periphery of the piston member 140. From there the transport duct 130 extends in a conventional manner further into the thrust bearing 43.

The transfer means 150 has driving means in the form of flanges 151 at its upper and lower ends to follow the piston member 140 to the end positions. By arranging axially extending transition areas in two positions with a central inlet along the axial length of the cylinder member 141, a comparatively shorter, axially extending transition area 136 can thus be formed on the piston member 140. As a result, the axial length of the piston member 140 could be reduced to a considerable extent.

Figure 4:
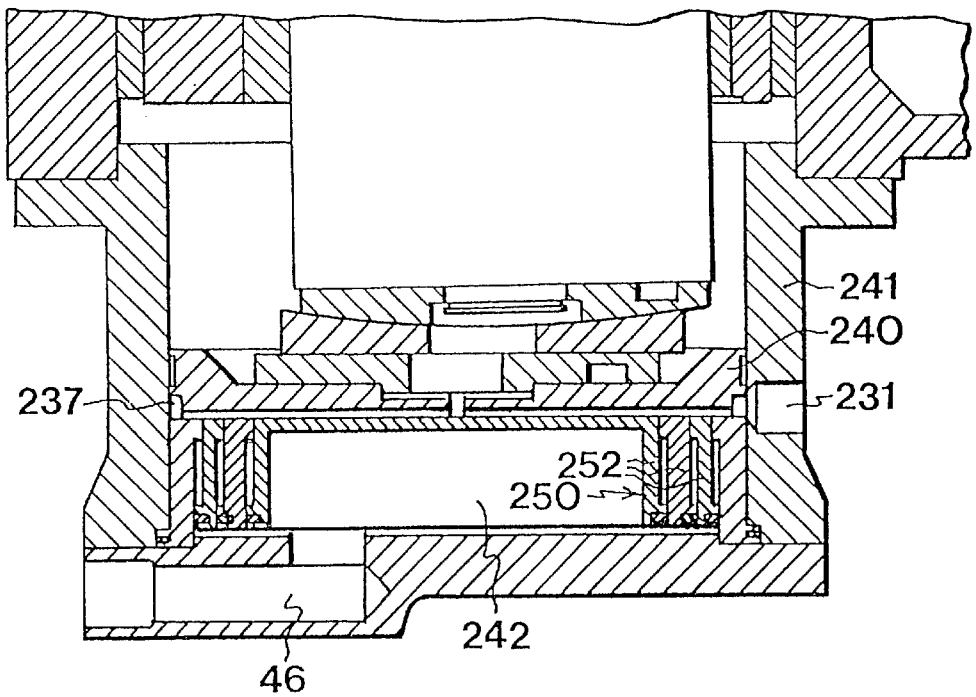
FIG. 4 is a view corresponding to FIG. 2 of a second embodiment, the lower position of the piston member being illustrated.
Figure 5:
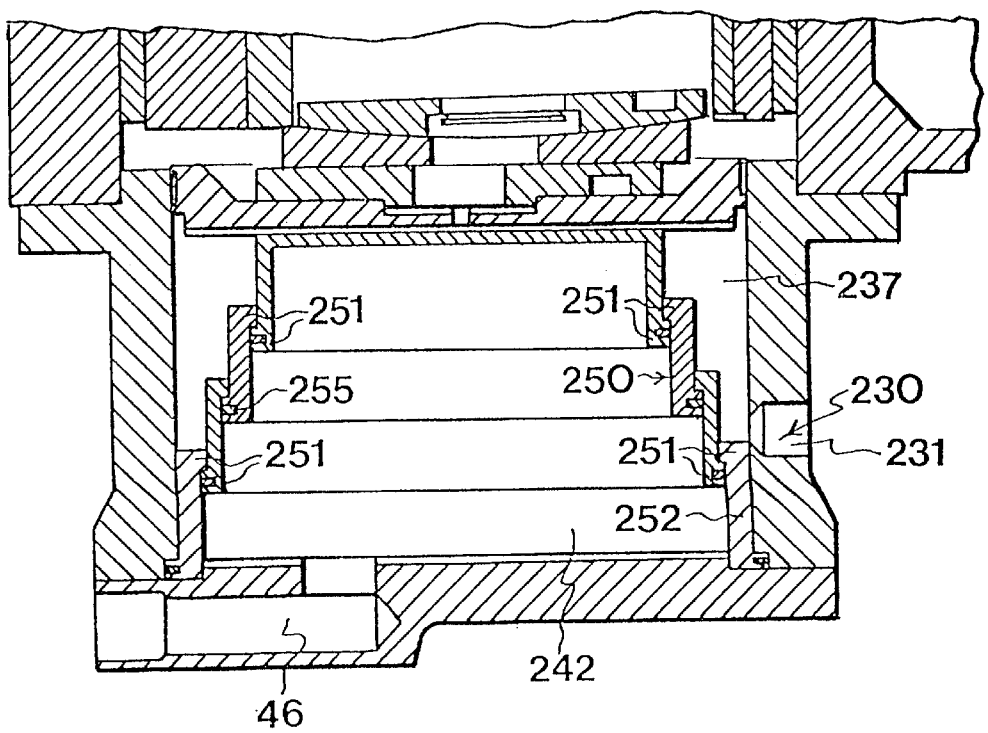
FIG. 5 corresponds to FIG. 4 except that the upper position of the piston member is illustrated.

FIGS. 4 and 5 illustrate a second embodiment of the invention. The piston member 240, which is shown in its lowermost and uppermost position, is arranged in a cylinder member 241. Between the underside of the piston member 240 and the base of the cylinder member 241, a telescopic transfer means 250 is arranged. The transfer means 250 comprises four annular elements 252 which are arranged radially inwardly of each other and which besides are mutually displaceable in the axial direction. Cooperating driving means in the form of flanges 251 are arranged at the ends of the various annular elements 252.

The hydraulic chamber 242 is in this manner defined radially inwards of the annular elements 252. Sealing means 255 are provided between the annular elements 252. The transport duct 230 extends in this embodiment from an inlet 231 of the cylinder member 241 through a chamber 237 and into the piston member 240. The chamber 237 is defined between the transfer means 250 and the piston member 240.

In this embodiment, it has thus been possible to give the piston member 240 a particularly small extent in the axial direction. The transfer means 250 certainly also has an extent in the axial direction. This is, however, dependent on the number of annular elements 252. By increasing the number of annular elements 252, the axial extent of the transfer means 250 in the compressed position, i.e. the lowermost position of the piston member 240, can be further reduced.

Figure 6:
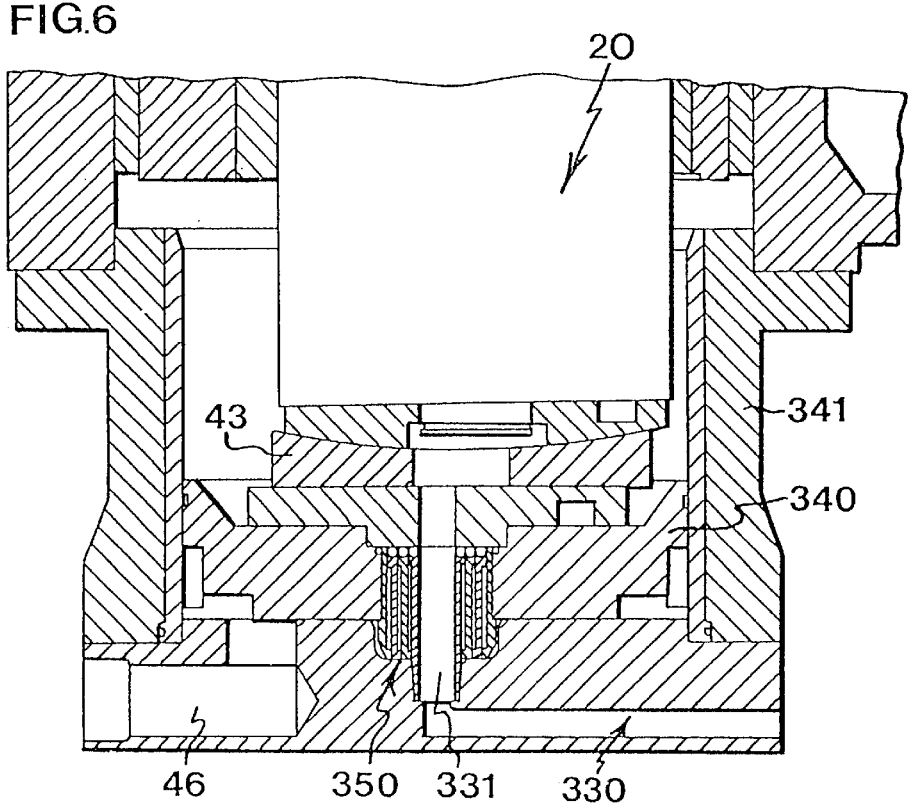
FIG. 6 is a view corresponding to FIG. 2 of a third embodiment, the lower position of the piston member being illustrated.
Figure 7:
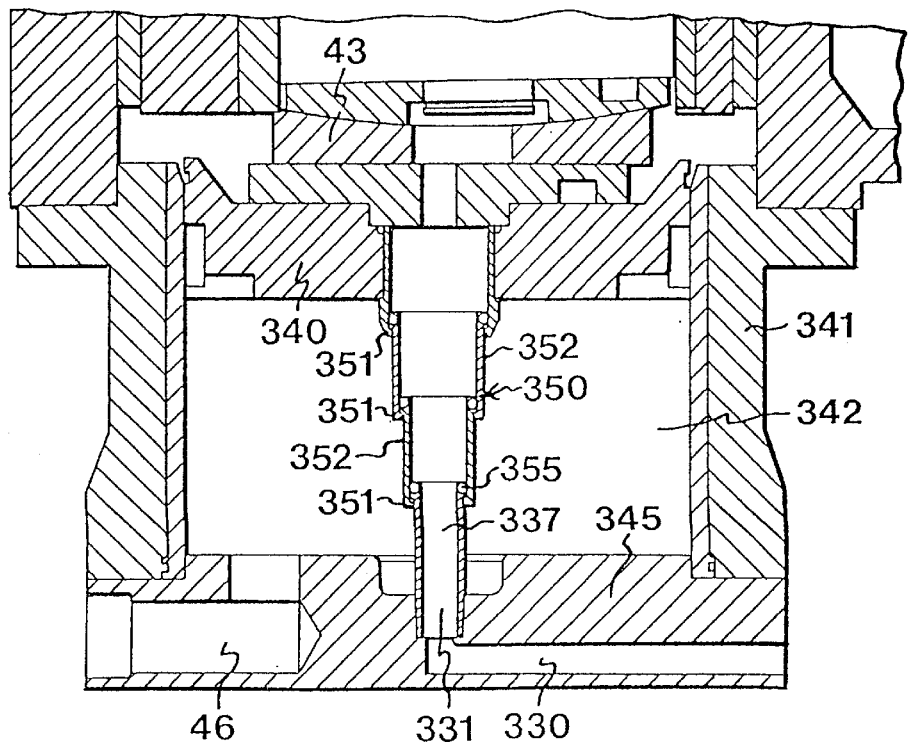
FIG. 7 corresponds to FIG. 6, except that the upper position of the piston member is illustrated.

FIGS. 6 and 7 illustrate one more preferred embodiment of the invention. Like in the previously described embodiments, the piston member 340 is slidingly displaceable in the cylinder member 341. The transport duct 330 extends via the base of the cylinder member 341 through a transfer means 350 to the piston member 340, from where it extends to the thrust bearing 43.

In this embodiment, just as in the preceding one, the transfer means 350 is telescopic and comprises a plurality of annular elements 352, which are arranged radially inwardly of each other and which are mutually slidingly displaceable in the axial direction. Driving means in the form of flanges 351 and seals 355 are correspondingly arranged.

In contrast to the previous embodiment, the transport duct 330 is arranged to have its inlet 331 to the transfer means 350 in the base 345 of the cylinder member 341. A portion 337 of the duct 330 is defined inwardly of the annular elements 352. The hydraulic chamber 342 is thus defined between the transfer means 350 and the cylinder member 341.

The transfer means 350 is in this embodiment recessed in both the piston member 340 and the base 345 of the cylinder member 341. Also in this embodiment, the piston member 340 could be given a small axial extent. By the transfer means 350 being given a recessed position, it takes up no additional axial space when the piston is located in its lowermost position.

Figure 8:
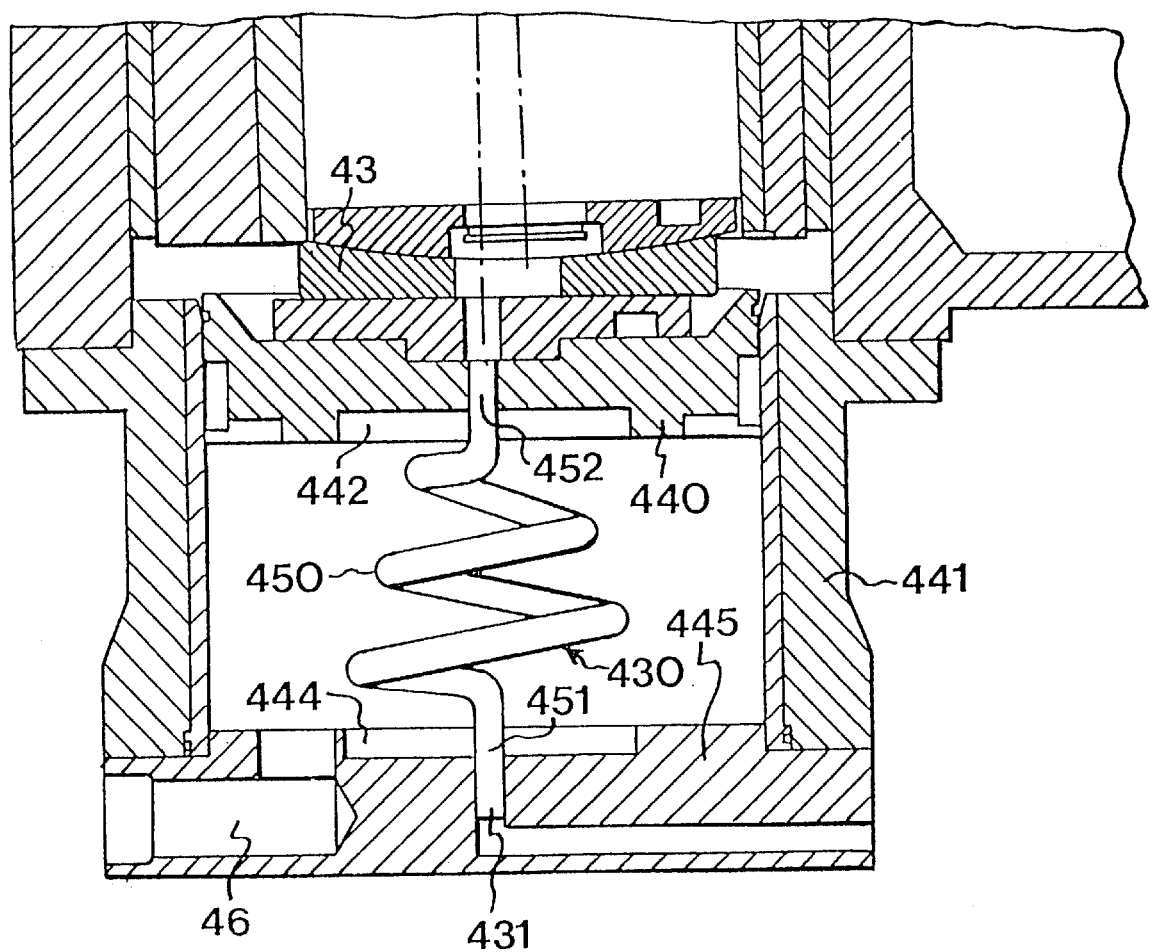
FIG. 8 is a view corresponding to FIG. 2 of a fourth embodiment, the upper position of the piston member being illustrated.

FIG. 8 shows a further embodiment of the invention, however, merely in the uppermost position of the piston member 440. The piston member 440 is slidingly displaceable in the cylinder member 441 and, like in the preceding embodiment, the transport duct 430 extends via the base 445 of the cylinder member 441 through a transfer means 450 to the piston member 440 and from there to the thrust bearing 43.

According to the fourth embodiment of the invention, the transfer means 450 is formed as a flexible tube. The tube 450 is preferably die-cast in helical winding of such a shape that the winding radii increase/decrease successively along the axial direction, such that a spiral forms and such that there is no risk of the tube 450 being squeezed when the piston member 440 is in its lowermost position.

Recesses 442, 444 are formed in the piston member 440 and in the base 445 of the cylinder member 441 to accommodate the tube 450 in the lowermost position of the piston member 440.

The lower part or the portion 451 of the tube 450 is displaceable relative to the piston member 440, and the upper part or portion 452 of the tube is displaceable relative to the cylinder member 441.

It should be understood that the invention is not limited to the embodiments described above and that the inventive idea expressed in the accompanying claims can be accomplished in various ways.

What is claimed is:

1. A gyratory crusher comprising
   a body,
   an annular outer shell fixedly connected to the body about an essentially vertical center axis,
   a shaft member supported within the outer shell to perform, during crushing, a swinging movement about the center axis,
   a crushing chamber defined between the outer shell and an annular inner shell arranged on the shaft member,
   a piston member displaceable generally along the center axis and arranged in a cylinder member associated with the body, the piston member having an upper end for supporting, via an intermediate thrust bearing, a lower end of the shaft member, and
   a transport duct extending through the piston member and adapted to supply to the thrust bearing a medium promoting the bearing function,
   wherein the transport duct is defined upstream of the piston member by a transfer means at least a part of which is displaceable relative to the piston member and at least a part of which is displaceable relative to the cylinder member.

2. A crusher as claimed in claim 1, wherein the piston member is movable between an upper and a lower position, the distance between the upper and the lower position being greater than the axial length of the piston member.

3. A crusher as claimed in claim 1, wherein the transfer means comprises at least one annular element movable in the axial direction.

4. A crusher as claimed in claim 3, wherein the annular element is movably arranged between the piston member and the cylinder member the transport duct extending from an inlet in the cylinder member radially through the annular element to the piston member and the transport duct in each transition between the cylinder member, the annular element and the piston member having an axially extended transfer area.

5. A crusher as claimed in claim 3, wherein the transfer means has an axially adjustable length, such that a predetermined length is assigned to each piston position.

6. A crusher as claimed in claim 5, wherein the transfer means is telescopic and includes a plurality of telescopically movable, annular elements an upper element being connected to the piston member and a lower element being connected to the cylinder member.

7. A crusher as claimed in claim 6, wherein the transport duct extends from an inlet at a lower end of the cylinder member, internally through the telescopic transfer means to the piston member.

8. A crusher as claimed in claim 6, wherein the transport duct is defined between the telescopic transfer means and the cylinder member and extends from an inlet adjacent a lower end of the cylinder to the piston member.

9. A crusher as claimed in claim 1, wherein the transfer means comprises a flexible means which extends from an inlet at a lower end of the cylinder member to the piston member.

* * * * *

UNITED STATES PATENT AND TRADEMARK OFFICE
CERTIFICATE OF CORRECTION

PATENT NO. : 6,328,237 B1
DATED : December 11, 2001
INVENTOR(S) : Urban Thysell

It is certified that error appears in the above-identified patent and that said Letters Patent is hereby corrected as shown below:

Title page,
Item [30], Foreign Application Priority Data, delete "Oct. 29, 1998 (SE) 9703967" and insert therefore -- Oct. 30, 1997 (SE) 97039670-1 --.

Column 1,
Lines 1-2, delete the first sentence in its entirety, and insert the following:

-- This application is a continuation of International Application No. PCT SE98/019856 filed October 29, 1998, claiming priority from Swedish Patent Application 97039670-1 filed October 30, 1997. --

Column 2,
Line 47, after "direction" and before "The", insert a period [.].

Column 4,
Line 13, after "with" delete "referenceto" and insert therefore -- reference to --.

Signed and Sealed this

Twentieth Day of August, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,328,237 B1
DATED : December 11, 2001
INVENTOR(S) : Urban Thysell

It is certified that error appears in the above-identified patent and that said Letters Patent is hereby corrected as shown below:

Title page,
Item [30], Foreign Application Priority Data, delete "Oct. 29, 1998 (SE) 9703967" and insert therefore -- Oct. 30, 1997 (SE) 9703967-1 --.

Column 1,
Lines 1-2, delete the first sentence in its entirety, and insert the following:

-- This application is a continuation of International Application No. PCT SE98/01956 filed October 29, 1998, claiming priority from Swedish Patent Application 9703967-1 filed October 30, 1997. --

Column 2,
Line 47, after "direction" and before "The", insert a period [.].

Column 4,
Line 13, after "with" delete "referenceto" and insert therefore -- reference to --.

This certificate supersedes Certificate of Correction issued August 20, 2002

Signed and Sealed this

Twelfth Day of November, 2002

*Attest:*

*Attesting Officer*

JAMES E. ROGAN
*Director of the United States Patent and Trademark Office*